March 2, 1954
C. F. RENCH
2,671,171
ELECTRONIC ACCUMULATOR
Original Filed Jan. 7, 1950
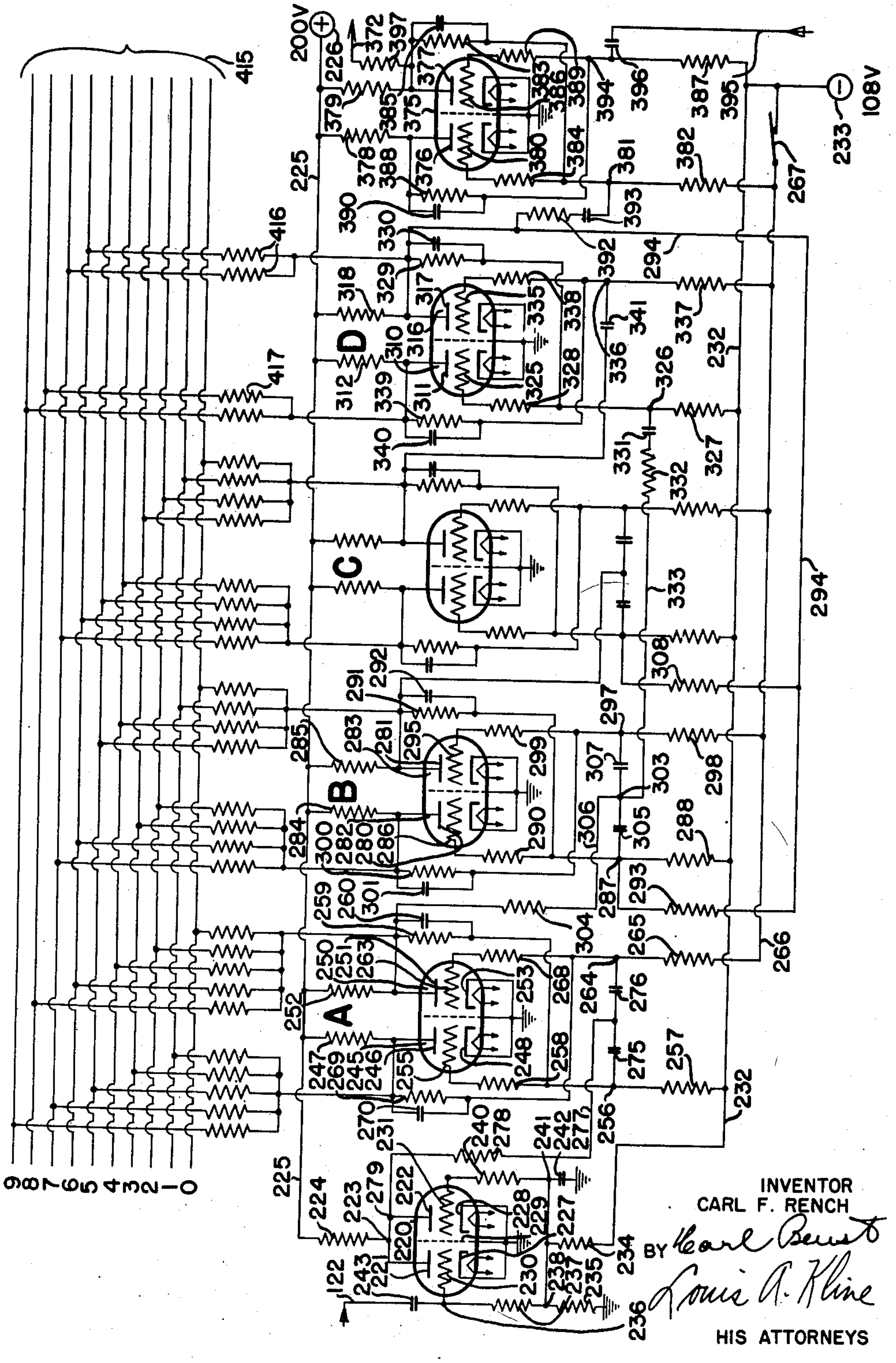
INVENTOR
CARL F. RENCH
BY Carl Beust
Louis A. Kline
HIS ATTORNEYS Patented Mar. 2, 1954

2,671,171

UNITED STATES PATENT OFFICE 2,671,171

ELECTRONIC ACCUMULATOR

Carl F. Rench, Troy, Ohio, assignor to The National Cash Register Company, Dayton, Ohio, a corporation of Maryland Original application January 7, 1950, Serial No. 137,311, now Patent No. 2,591,008, dated April 1, 1952. Divided and this application March 14, 1951, Serial No. 215,485

5 Claims. (Cl. 250—27)

This invention relates to a novel electronic accumulating apparatus in which a plurality of electronic devices are provided in each denominational order, and are interconnected to count in the decimal notation and to represent digits in the decimal notation by combinations of conducting and non-conducting conditions of the electronic devices.

This is a division of United States application Serial No. 137,311, which was filed on January 7, 1950, and which issued April 1, 1952, as a Patent No. 2,591,008.

Each denominational order of the accumulator utilizes four trigger pairs which can be operated alternately to stable states, or "on" and "off" conditions, in response to impulses, which trigger pairs are connected in cascade. Input impulses are applied to the first trigger pair of the cascade, which pair, on each second operation thereof will send an operating impulse over the cascade connection to the second trigger pair. In like manner the second trigger pair will send impulses over the cascade connection to the third trigger pair and the third trigger pair will send impulses over the cascade connection to the fourth trigger pair.

In addition to the cascade connections the device has a direct-current circuit which connects the fourth trigger pair to the bias potential supply of the second and third trigger pairs. This connection enables the fourth trigger pair to control the bias on the second and third trigger pairs in such a manner that when the fourth trigger pair is in one of its conditions of stability the bias on the second and third trigger pairs will be such as to permit these pairs to operate normally as trigger pairs; but when the fourth trigger pair is in its other condition it will change the bias to cause the second and third trigger pairs each to make an additional operation and incidentally will prevent these two trigger pairs from making further trigger operations.

A further control circuit from the first trigger pair to the fourth trigger pair becomes effective after the fourth trigger pair has caused the second and third trigger pairs to make an extra operation and will cause an additional operation of the fourth trigger pair to restore the second and third trigger pairs to further normal operation as trigger pairs.

These novel circuit arrangements which enable a direct-current control to be utilized to cause additional operations of the second and third trigger pairs have distinct advantages because they reduce the number of circuit components necessary for the required operation by omitting rectifiers, capacitors and other such circuit components which would be necessary if impulse-type of control as distinguished from the direct-current type were used. Further, the arrangement using the direct-current type of control is more stable in operation and less susceptible of improper operation due to erroneous feed-back of impulses over the control circuits, which erroneous feed-back occurs when capacitors are used in impulse-type controls unless proper precautions such as rectifiers or decoupling tubes are used.

It is an object of the invention to provide an improved electronic digital accumulator of the combinational type which uses direct-current feed-back circuits and related controls to enable accumulation in the decimal notation to be accomplished using four trigger pairs.

A further object of the invention is to provide a decimal accumulator, of the type which uses four trigger pairs in cascade, with novel controls which require a minimum of circuit components other than those necessary for the trigger connections and cascade connections.

A further object of the invention is to provide a decimal accumulator, of the type which uses four trigger pairs in cascade in each denominational order, with novel controls which vary the bias on certain trigger pairs to cause additional operations thereof as required in combinationally representing certain digits of the decimal notation.

With these and other incidental objects in view, the invention includes certain novel features of construction and combinations of parts, a preferred form or embodiment of which is hereinafter described with reference to the drawings which accompany and form a part of this specification.

The drawing shows a circuit diagram of the units denominational order of the accumulator, including tens transfer means and coupling means through which entries can be made into the order and shows schematically a digit-manifesting means.

In order that the invention may be explained more fully, a preferred embodiment of the invention will be described, in which description values of potential and circuit elements, such as resistors and capacitors, will be given and types of tubes will be specified. It is not intended, however, to limit the invention to the embodiment described nor to limit the circuit values and tube types to those specified, because these are merely selected as illustrative. It is obvious that other potentials and/or other similar tube types can be used and the circuit values of resistance and capacitance can be adjusted to maintain the proper relation between the various parts of the circuits. Throughout the circuit diagram, the heater elements for the tubes are shown conventionally.

The drawing shows one denominational order of the accumulator but as many orders may be provided as desired. Each denominational order includes an electronic coupling device, an electronic tens transfer means, and a plurality of interrelated electronic devices capable of accumulating in the decimal notation and representing, in combinational form, the units digit of said accumulation.

The particular denomination shown in the drawing is the units denominational order of the accumulator.

The coupling device is shown as a twin triode, tube 220, preferably of the type sold by the Western Electric Company under the type designation 2C51, though, as will appear later, only one of the triodes is utilized in the units order, the one for coupling the order of the accumulator to the corresponding denominational output conductor of an impulse generator. In the embodiment shown, there are no tens transfer entries to be made in the units denominational order of the accumulator, and accordingly the other of the triodes is not used to control entries therein.

Tube 220 has both of its anodes 221 and 222 connected together over point 223 and resistor 224 of 100,000 ohms to conductor 225, to which a potential of +200 volts is applied at terminal 226, and has its cathodes 227 and 228 and its shield 229 grounded.

Grids 230 and 231 have biasing potential supplied thereto from a biasing potential supply circuit which extends to ground from conductor 232, to which a potential of −108 volts is applied at terminal 233, over resistor 234 of 100,000 ohms and resistor 235 of 15,000 ohms, grid 230 being connected over point 236, and resistor 237 of 47,000 ohms to point 238 in the bias potential supply circuit, and grid 231 being likewise connected over a resistor 240 of 47,000 ohms to point 241 in the bias potential supply circuit. Point 241 is connected to ground over a stabilizing capacitor 242 of 500 micro-microfarads. The potential supplied to the grids normally biases both halves of the tube to cut-off.

The units denominational input conductor 122 to which positive potential impulses may be supplied by any suitable impulse generator, one of which is disclosed in said application, Serial No. 137,311, is coupled over capacitor 243 of 250 micro-microfarads to grid 230, which controls conduction between anode 221 and cathode 227 of the left triode in the tube 220. Whenever an impulse of an impulse train is impressed on conductor 122, it will be effective to cause the triode, which is controlled by grid 230, to conduct and produce a potential drop at point 223 due to resistor 224 in its anode circuit.

In the units denomination of the disclosed embodiment of the accumulator, there will be no tens transfer entries from a lower order, consequently grid 231, which controls the right-hand triode of the tube 220, will have no impulses applied thereto, so this triode of the tube will remain biased to cut-off.

The potential drops which are produced at point 223 when conduction occurs in the tube are used to provide negative impulses to operate the interrelated devices of this denominational order for accumulating amounts. The interrelated devices consist of four trigger pairs connected in cascade and with novel direct-current feed-back circuits and auxiliary controls to enable the four trigger pairs to accumulate values in the decimal notation and to represent the various digits of the notation by different combinations of "on" or "off" conditions of the trigger pairs.

As is well known, an electronic device known as a trigger pair consists of a pair of electron discharge tubes having interconnections therebetween to control their operation so that, at any given time, one of the tubes is conducting and the other tube is non-conducting, and the act of changing the conducting condition of one of the tubes will cause the conducting condition of the other of the tubes of the pair to change. With the circuit constants to be given herein, the trigger pairs will be relatively insensitive to positive impulses but will respond to negative impulses, so that a negative input impulse applied commonly to the tubes of the pair or to the conducting tube of the pair will cause reversal of the conducting and non-conducting condition of the tubes. The trigger pair may be made up of two separate tubes; however, in order to provide a more compact device, each of the cascaded trigger pairs in the disclosed embodiment of the invention is formed by interconnecting the two halves of a twin triode type of tube, preferably of the aforementioned 2C51 type.

The first trigger pair of the cascade will be that marked A, the second trigger pair will be B, the third trigger pair will be C, and the fourth and final trigger pair of the cascade will be D. The trigger pairs will be considered in their "on" condition when the left triode of the trigger pair is conducting and in their "off" condition when the left triode of the trigger pair is in non-conducting condition. The manner in which the trigger pairs represent the various digits can be seen from the following table, in which "O" designates the "off" condition and "X" designates the "on" condition of a trigger pair.

| Digit | A | B | C | D |
|---|---|---|---|---|
| 0 | O | O | O | O |
| 1 | X | O | O | O |
| 2 | O | X | O | O |
| 3 | X | X | O | O |
| 4 | O | O | X | O |
| 5 | X | O | X | O |
| 6 | O | X | X | O |
| 7 | X | X | X | O |
| 8 | O | X | X | X |
| 9 | X | X | X | X |
| 0 | O | O | O | O |

Trigger pair A is the first trigger pair of the cascade and is operated by impulses impressed thereon from the coupling device, tube 220. The left triode 245 of the trigger pair has its anode 246 connected over resistor 247 of 100,000 ohms to the +200-volt conductor 225 and has its cathode 248 connected directly to ground.

Similarly, the right triode 250 of the trigger pair has its anode 251 connected over resistor 252 of 100,000 ohms to the +200-volt conductor 225 and has its cathode 253 directly connected to ground.

Grid 255 of the left triode 245 is connected to a negative bias supply over resistor 258 of 100 ohms, point 256, resistor 257 of 510,000 ohms, and conductor 232, to which a potential of −108 volts is applied at terminal 233. and also is coupled to the anode 251 of the right triode 250 over a network containing the resistor 258 and resistor 259 of 200,000 ohms, resistor 259 being shunted by capacitor 260 of 150 micro-microfarads. In a similar manner, the grid 263 of the right triode 250 is connected to the negative bias supply over resistor 268 of 100 ohms, point 264, resistor 265 of 510,000 ohms, and to conductor 266, which is connected over a reset switch 267 to terminal 233. Grid 263 is also coupled to the anode 246 of the left triode 245 over a network containing the resistor 268 and resistor 269 of 200,000 ohms, resistor 269 being shunted by capacitor 270 of 150 micro-microfarads.

Points 256 and 264 in the bias supply circuits for the grids 255 and 263 are coupled, respectively, over capacitors 275 and 276 of 25 micromicrofarads to a conductor 277, thence over resistor 278 of 47,000 ohms to the point 279 in the anode circuit of the coupling device, tube 220.

With the circuit constants given, trigger pair A will be responsive to negative impulses and will reverse the conducting status of the triodes therein each time a negative impulse is impressed on the grids of the triodes. Accordingly, the trigger pair will reverse its conduction status each time the coupling device responds to an impulse from the impulse generator and sends a negative impulse to the pair.

Trigger pair B, which is the second trigger pair of the cascade, is operated to reverse the conductive condition of the triodes therein in response to an impulse impressed thereon from trigger pair A when that pair goes from its "on" condition to its "off" condition. Trigger pair B is also operated from its "off" condition to its "on" condition in response to a novel direct-current feedback connection from trigger pair D in a manner to be explained more fully hereinafter. The anodes 280 and 281, respectively, of the left triode 282 and the right triode 283 of this pair are connected over resistors 284 and 285 of 100,000 ohms, respectively, to the +200-volt conductor 225, and the cathodes are connected to ground.

Grid 286 of the left triode 282 is connected over resistor 290 of 100 ohms to point 287 in a bias potential supply resistance network. This network extends from conductor 232, to which a potential of −108 volts is applied, over resistor 288 of 390,000 ohms, point 287, and over resistor 293 of 390,000 ohms and conductor 294 of the novel direct-current feed-back circuit to the anode of the right triode of trigger pair D and enables the bias on grid 286 to be varied according to the "on" and "off" condition of trigger pair D in a manner to be explained more fully hereinafter. Grid 286 is also coupled to the anode 281 of the right triode 283 over a network containing the resistor 290 and resistor 291 of 390,000 ohms, resistor 291 being shunted by capacitor 292 of 150 micro-microfarads.

Grid 295 of the right triode 283 is connected to the negative bias supply by being connected over resistor 299 of 100 ohms, point 297, and resistor 298 of 510,000 ohms to conductor 266. Grid 295 is also coupled to the anode 280 of the left triode 282 over the resistor 299 and resistor 300 of 390,000 ohms, resistor 300 being shunted by a capacitor 301 of 150 micro-microfarads.

Point 287 in the bias supply circuit for grid 286 is connected over capacitor 305 of 25 microMicrofarads and point 303 to conductor 306, and thence over resistor 304, of 47,000 ohms, to the anode 251 of the right triode 250 of trigger pair A. Point 297 in the bias supply circuit for grid 295 is also coupled to conductor 306 over a capacitor 307 of 25 micro-microfarads. The bias applied to the grids of trigger pair B is such that each time trigger pair A is operated to its "off" condition and its right triode 250 conducts, the negative impulse which is sent over capacitors 304 and 307 to the grids 286 and 295 of the trigger pair B will cause a reversal of the conducting condition of the triodes.

Trigger pair C, which is the third trigger pair of the cascade, is operated to reverse the conducting condition of the triodes therein in response to an impulse from trigger pair B when that pair goes from its "on" condition to its "off" condition. Trigger pair C also has potential applied to the grid of its left triode from a resistance network which includes resistor 308, of 390,000 ohms, and the conductor 294 of the direct-current feed-back circuit from the anode of the right triode of trigger pair D, which circuit is effective to cause trigger pair C to be operated from its "off" condition to its "on" condition, when trigger pair D is turned to its "on" condition, in a manner to be explained more fully hereinafter. The circuit arrangement and circuit constants for trigger pair C are identical with those of trigger pair B and will not be repeated.

Trigger pair D, which is the last trigger pair in the cascade, is operated from its "off" condition to its "on" condition by impulses impressed on its right triode from trigger pair C and is also operated from its "on" condition to its "off" condition in response to impulses directly applied to the grid of its left triode from trigger pair A. Trigger pair D is effective, when in "on" condition, to cause trigger pairs B and C to be turned from "off" to "on" over the novel direct-current feed-back circuits thereto. Trigger pair D is also effective to send an impulse to a tens transfer means to prepare it for a tens transfer operation.

The left triode 310 of trigger pair D has its anode 311 connected over resistance 312 of 100,000 ohms to the +200-volt conductor 225 and has its cathode connected to ground. In this trigger pair, the right triode 316 has its anode 317 connected over resistor 318 of 80,000 ohms to the +200-volt conductor 225, and has its cathode connected to ground.

Grid 325 of the left triode 310 is connected to the negative bias supply over resistor 328 of 100 ohms, point 326, resistor 327 of 510,000 ohms, and conductor 232, and is also coupled to the anode 317 of the right triode 316 over the resistor 328 and resistor 329 of 390,000 ohms, resistor 329 being shunted by capacitor 330 of 500 micro-microfarads.

Similarly, the grid 335 of the right triode 316 is connected to the negative bias supply over resistor 338 of 100 ohms, point 336, resistor 337 of 510,000 ohms, and conductor 266. Grid 335 is also coupled to the anode 311 of the left triode 310 over the resistor 338 and resistor 339 of 390,000 ohms, resistor 339 being shunted by capacitor 340 of 150 micro-microfarads.

The point 336 in the bias potential supply circuit for grid 335 of the right triode is coupled over capacitor 341, of 25 micro-microfarads, to the anode of the right triode of trigger pair C and receives a negative impulse therefrom each time trigger pair C goes from "on" to "off" in the change from a digit representation of "7" to "8." This negative impulse which is applied to grid 335 will cause trigger pair D to go from its "off" condition to its "on" condition.

The point 326 in the potential supply circuit to grid 325 of the left triode is connected over capacitor 331, of 25 micro-microfarads, resistor 332, of 47,000 ohms, and conductor 333 to point 303 in the circuit from trigger pair A to the grids of the triodes of trigger pair B. The negative potential impulses which are sent from trigger pair A to trigger pair B when trigger pair A is turned from "on" to "off" are also applied over the conductor 333, resistor 332, and capacitor 331 to the grid 325 to turn trigger pair D from "on" to "off." As is seen from the chart given earlier herein, trigger pair D is in "off" condition for all digit representations except "8" and "9," so that the impulses from trigger pair A when it changes from a representation of "1" to "2," from "3" to "4," from "5" to "6," and from "7" to "8" will not be effective to cause trigger pair D to change its conducting status. The only impulse from trigger pair A which is effective to turn trigger pair D from "on" to "off" is that which is generated by the turning of trigger pair A from "on" to "off" in changing from the digit representation of "9" to "0."

The manner in which trigger pair D exerts its control over the trigger pairs B and C through the direct-current feed-back circuits, and is controlled to enable this control to be used, is as follows:

As is clear from the chart given earlier herein, trigger pair D is in its "off" condition for digit representations of "0" to "7," and, when trigger pair D is in "off" condition, its right triode will be conducting and anode 317 will be at about +15 volts potential due to the drop across its anode resistor 318 and to the low impedance of the conducting triode. The potential of the anode under this condition will be reflected on the potential of the grid 286 of the left triode of trigger pair B and the corresponding grid of trigger pair C, through the direct-current feed-back circuit and their respective resistance networks, to give these grids a normal bias which will allow the trigger pairs respectively to operate in response to negative impulses from trigger pairs A and B, as is necessary in the combinational representation of the various digit values.

When trigger pair D goes to its "on" condition from "off" condition, in the changing of the representation from "7" to "8," the right triode 316 will change from conducting condition to non-conducting condition, and the potential of anode 317 will rise to a sufficiently positive potential that, when it is reflected back on the grids of the left triodes of trigger pairs B and C over the direct-current feed-back circuit, it will cause the steady bias potential of these grids to become positive enough to cause the left triodes of these trigger pairs to become conducting and, through the trigger connections, cause these trigger pairs to go from their "off" condition to their "on" condition as required for the combinational representation of the digit "8."

Trigger pairs B and C will remain in their "on" condition when the cascaded trigger pairs represent the digit "9."

When the impulse is applied to the cascaded trigger pairs to change the representation from "9" to "0," it will first cause the trigger pair A to change from "on" to "off," and, in turning "off," trigger pair A will send a negative impulse to trigger pairs B and D, the impulse on trigger pair D changing the pair from "on" to "off" and thereby removing the positive bias which was supplied to the grids of the left triodes of trigger pairs B and C. With the reduction of this positive bias on the left triode of trigger pair B, the remaining effect of the negative impulse from trigger pair A causes trigger pair B to turn from its "on" condition to its "off" condition, and the impulse from trigger pair B, as it turns to "off," will turn trigger pair C from its "on" condition to its "off" condition. The impulse from trigger pair C will not be effective to cause trigger pair D to go from its "off" condition to its "on" condition, because the above changes in the status of trigger pairs B and C is so rapid that the impulse from trigger pair C will be impressed on trigger pair D before the charges stored on capacitors 330 and 340, in the turning of trigger pair D from "on" to "off," have been dissipated.

It is to be noted that, with the novel direct-current feed-back circuits and the associated controls, the four cascaded trigger pairs can be operated to accumulate values in the decimal notation in a very simple manner. The feed-back and controls of the denomination are effected with the minimum of additional components, since two resistors—resistors 293 and 308 in the feed-back circuits—are the only components required in addition to the usual trigger and cascade connections. The novel controls eliminate the need of additional capacitors, rectifiers, or other control tubes which previously have been required to enable the desired results to be obtained. Consequently the novel arrangement results in a smaller and more compact denominational unit.

The manner in which the various trigger pairs are operated in combinations to represent digits of the decimal notation will now be explained in an operation in which ten impulses are sent to the denomination to operate it through a complete cycle and return it to starting condition. As shown in the tabulation given earlier herein, the zero or starting condition of the trigger pairs of the denomination is that in which all the trigger pairs A, B, C, and D are in "off" condition, with their right triodes conducting. All input impulses to the denomination are applied to the coupling device, tube 220, which in turn applies them to trigger pair A, the first trigger pair of the cascade.

The first impulse applied to trigger pair A changes it from its "off" condition to its "on" condition, so that the trigger pair A will be "on" and trigger pairs B, C, and D will be "off" to represent the digit "1."

The second impulse applied to trigger pair A changes it from "on" to "off." As trigger pair A goes from "on" to "off," it sends an impulse to trigger pair B, which turns trigger pair B from "off" to "on." At the end of this entry, trigger pairs A, C, and D are "off," and trigger pair B is "on" to represent the digit "2."

The third impulse applied to trigger pair A merely changes that pair from "off" to "on." At the end of this entry, trigger pairs A and B are "on" and trigger pairs C and D are "off" to represent the digit "3."

The fourth impulse applied to trigger pair A turns trigger pair A from "on" to "off," and trigger pair A, in turning "off," sends an impulse to trigger pair B to turn it from "on" to "off." Trigger pair B, in turning from "on" to "off," sends an impulse to trigger pair C to turn it from "off" to "on." At the end of this entry, trigger pairs A, B, and D are "off" and trigger pair C is "on" to represent the digit "4."

The fifth impulse applied to trigger pair A merely turns this trigger pair from "off" to "on," and, at the end of this entry, trigger pairs A and C will be "on" and trigger pairs B and D will be "off" to represent the digit "5."

The sixth impulse applied to trigger pair A will turn this trigger pair from "on" to "off," and, in turning from "on" to "off," trigger pair A will send an impulse to trigger pair B to turn it from "off" to "on." At the end of this operation, trigger pairs A and D will be "off," and trigger pairs B and C will be "on" to represent the digit "6."

The seventh impulse applied to trigger pair A will merely turn trigger pair A from "off" to "on," and, at the end of this entry, trigger pairs A, B and C will be "on" and trigger pair D will be "off" to represent the digit "7."

The eighth impulse applied to trigger pair A will turn trigger pair A from "on" to "off," and the turning of trigger pair A "off" sends an impulse to trigger pair B to turn trigger pair B from "on" to "off." Trigger pair B, in turning "off," will send an impulse to trigger pair C to turn it from "on" to "off." Trigger pair C, in turning "off," will send an impulse to trigger pair D to turn it from "off" to "on." The turning of trigger pair D "on" will cause the potential of the anode of its right triode to become more positive, and this is reflected through the direct-current feed-back circuit on the bias supplies for the grids of the left triodes of trigger pairs B and C to make these grids sufficiently positive to return trigger pairs B and C to their "on" condition. At the end of this entry, trigger pairs B, C, and D will be "on" and trigger pair A will be "off" to represent the digit "8."

The ninth impulse applied to trigger pair A will merely turn trigger pair A from "off" to "on," so that, at the end of this entry, all the trigger pairs will be "on" to represent the digit "9."

The tenth impulse which is applied to trigger pair A will turn trigger pair A from its "on" condition to its "off" condition, and trigger pair A, in turning to its "off" condition, will send an impulse to trigger pairs B and D to turn them from "on" to "off." Trigger pair D, in turning "off," will remove the positive bias from the grids of the left triodes of trigger pairs B and C. With the positive bias removed, trigger pair B can be turned "off" from trigger pair A. Trigger pair B, in turning to its "off" condition, will send an impulse to trigger pair C to turn it from "on" to "off." Trigger pair C, in turning "off," will send an impulse to trigger pair D. Trigger pair D has already been turned to "off" by the impulse from trigger pair A, and, as explained earlier herein, the impulse from trigger pair C will not be effective to turn it "on" again. At the end of this entry, the trigger pairs A, B, C and D will be in "off" condition, which is the condition in which they were at the beginning of the entry of the ten impulses.

It is seen, therefore, that the four cascaded trigger pairs of the denomination can be operated to accumulate values in the decimal notation and be returned to starting condition upon the application of ten impulses to the first trigger pair of the cascade and can represent the various digits "1" to "9" and "0" of the accumulator by combinations of "on" and "off" conditions of the several trigger pairs.

Higher denominational orders of the accumulator will be similar to that shown in the drawing but will have a connection to the grid of the right triode of the coupling device from the tens transfer means of the next lower order to enable transfer entries to be made therein when required.

Tens transfer means are provided for the accumulator to make an entry of a value of "one" in the next higher denominational order of the accumulator each time a denominational order exceeds its capacity. Since the same type of transfer means couples adjacent denominational orders of the accumulator, the operation of the various transfer means will be clear from a description of the operation of the transfer means shown in the drawing for coupling the units and tens denominational orders of the accumulator.

The transfer means includes a trigger pair which is operated from a normal conducting condition when entries in the related denominational cascaded trigger pairs cause them to exceed their digital capacity and is effective to cause an entry in the next higher order when restored to normal condition.

The tens transfer trigger pair is shown as being made up of two halves of a twin triode, tube 375, preferably of the above-mentioned 2C51 type.

Anodes 376 and 377 of the left and right triodes of this trigger pair are connected, respectively, over resistors 378 and 379 of 100,000 ohms each to the +200-volt conductor 225, and the cathodes of these triodes are connected to ground.

Grid 380 of the left triode is coupled to the negative bias supply conductor 266 over resistor 384, of 100 ohms, point 381, and resistor 382, of 510,000 ohms, and also is coupled to anode 377 to the right triode by the trigger connection including the resistor 384 and the resistor 383 of 390,000 ohms, resistor 383 being shunted by capacitor 385 of 500 micro-microfarads. In a corresponding manner, grid 386 of the right triode is coupled to the negative bias supply conductor 232 over resistor 389, of 100 ohms, point 394, and resistor 387, of 510,000 ohms and also is coupled to anode 376 of the left triode by the trigger connection including the resistor 389 and resistor 388, of 390,000 ohms, resistor 388 being shunted by capacitor 390, of 150 micro-microfarads.

When the accumulator is initially set in operation or is reset to zero, the tens transfer trigger pair is set in its normal condition, with the left triode conducting, as will be explained more fully hereinafter when the resetting operation is considered.

When a tens transfer is required, the cascaded trigger pairs of the denomination will cause the tens transfer trigger pair to operate to reverse its conducting status. This is accomplished in the following manner. As is seen from the tabulation given earlier herein, the trigger pair D will change from its "on" condition to its "off" condition only when the digit represented by the cascaded trigger pairs changes from "9" to "0." The drop across anode resistor 318 of the right triode of this trigger pair, which occurs when the pair changes from "on" to "off," is applied as a negative impulse to grid 380 of the left triode of the tens transfer trigger pair, over resistor 392 of 100,000 ohms, capacitor 393 of 25 micro-microfarads, and point 381, and will cause the tens transfer trigger pair to be operated from its normal condition and reverse the conducting status of its triodes to store the carry indication until the carry can be effected.

Negative potential transfer-effecting impulses are applied over conductor 395 during intervals between digit entries in the accumulator. One source of such impulses is disclosed in the application, Serial No. 137,311 of which this application is a division and reference may be had to that application for details thereof.

The impulses on conductor 395 are transmitted over capacitor 396 of 25 micro-microfarads to grid 386 of the right triode of the transfer trigger pair and will restore the trigger pair to its normal condition to send a transfer impulse to the next higher order, if the trigger pair had been operated from normal condition to store a carry during a digit-entering operation. The return of the transfer trigger pair to its normal condition will mean that the right triode will cease to conduct, and consequently its anode potential will become more positive. The potential rise of anode 377 will be transmitted as a +125-volt impulse over resistor 397 of 47,000 ohms, conductor 372 and a capacitor to the grid of the right triode of the coupling device of the tens denominational order which is not shown but which is similar to the coupling device 220 and will cause the entry of a value of "one" in the tens denominational order.

It is clear, therefore, that the tens transfer trigger pair will be operated from normal by its related denomination, when the accumulation in the cascaded trigger pairs has exceeded their digital capacity and the cascaded trigger pairs have indicated that a carry is required to the next higher order, and will store the carry indication until the end of the digit entry operation, at which time the first transfer-effecting impulse will return any operated tens transfer trigger pairs to their normal condition and cause the value of "one" to be entered in the next higher orders as required. The tens transfer-effecting impulses are continuously applied to the transfer means between digit entries, so that, whenever a tens transfer entry causes a denomination to exceed its capacity and operate the tens transfer trigger pair from its normal condition, the following transfer-effecting impulse will be effective to return the trigger pair to its normal condition and cause the required tens transfer entry to be made, thereby enabling carry-on-carry operations to take place.

If the tens transfer trigger pair has not been operated from its normal condition during the digit entry in its related denominational order, the right triode will be in non-conducting condition and the negative transfer-effecting impulses, which will be impressed thereon immediately after the digit-entering period, will have no effect thereon.

In a similar manner, other transfer means can be controlled from the trigger pairs of their related orders and can be operated by transfer-effecting impulses to cause tens transfer entries to be made in appropriate higher orders.

In order to prepare the accumulator initially to receive entries or to reset it to its zero condition, reset switches, as 267, are provided in the negative bias supply circuits for the grids of the right triodes of the trigger pairs A, B, C, and D of each denominational order. Momentary opening of the switches will remove negative bias potential from these grids and will cause the trigger pairs A, B, C and D to be set in their "off" condition.

The transfer trigger pairs in the various orders are also conditioned by the operation of the reset switches, which removes negative bias from the grids of the left triodes of these trigger pairs and causes these trigger pairs to be set to their normal position, with the left triode conducting. This control of the transfer trigger pairs from the reset switches insures that these trigger pairs will always be set to their normal condition initially or after a resetting operation, and prevents any improper transfers from being made as a result of changing trigger pair D to its "off" condition in the initial setting or resetting operations.

Means are provided to manifest the digit values represented by the combinations of "on" and "off" conditions of the cascaded trigger pairs of the various denominational orders of the accumulator.

The means for manifesting digits in the units denominational order is shown in the drawing, and, since the manifesting means for other orders is the same as this one, their operation will be clear from the explanation of this one.

Associated with the cascaded trigger pairs of this denominational order is a set of digit-representing conductors 415, containing a conductor for each of the digits "1" to "9" and "0." The anodes of the right and left triodes of the cascaded trigger pairs are connected through a resistance network selectively to various ones of the digit-representing conductors, the anode 317 of the right triode of trigger pair D being connected over resistors, as 416, of 1.3 megohms to the conductors representing "6" and "7," and the anodes of the remaining triodes being connected over resistors, as 417, of 2.2 megohms to various ones of the digit-representing conductors in a pattern which is clearly shown in the drawing.

Depending upon whether the trigger pairs are "on" or "off," the anode potentials of their left and right triodes will be either at almost +200 volts or at a much lower potential as a result of the drop across the anode resistors of the conducting triodes. The pattern of resistance network connections, as shown, is so arranged that, for any digit represented by the combination of "on" or "off" conditions of the cascaded trigger pairs, the conductor corresponding to that digit will have a potential which is less positive than that of any other digit-representing conductor and will thereby manifest the digit standing in that order of the accumulator.

If desired, the potentials of the digit-representing conductors can be sensed and can control an apparatus for positioning a digit-bearing wheel with the digit in reading position which corresponds to the conductor having the least positive potential. One such mechanism for accomplishing this result is shown in my co-pending application Serial No. 133,540, which was filed on December 17, 1949.

In a similar manner, digits represented by the "on" and "off" conditions in other denominational orders can be made apparent.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In an apparatus of the class described, the combination of four electronic devices, each operable alternately to one and to another condition in response to impulses impressed thereon, and including means to supply operating and bias potentials to the devices and to produce potential changes each time a device changes from either condition to the other, said devices by their one and other conditions, in combination, representing the digits "1" to "9" and "0"; circuits connecting the devices in series and enabling the potential change, which is produced when a device operates to one of said conditions, to be applied as an impulse to the next device of the series to cause an operation thereof; means to apply input impulses to the first device of the series; a direct-current circuit from the fourth device of the series to the bias potential supplies for the second and third devices to enable the fourth device to control the bias supplied to the second and third devices to cause them to be operated simultaneously from the fourth device each time the fourth device is in a certain one of said conditions; and means to connect the first device to the fourth device to enable the first device to operate the fourth device out of said certain condition.

2. In an apparatus of the class described, the combination of four trigger pairs, each operable to be triggered alternately to one and to another condition; means to supply operating potentials and bias potentials to the trigger pairs; circuits connecting the trigger pairs in series for selective operation in response to input impulses applied to the first pair of the series; means to couple a portion of the bias supply for the second and third trigger pairs of the series to the fourth trigger pair of the series to enable the fourth pair to control the bias on the second and third pairs, said fourth pair, when in one condition, causing the bias on the second and third pairs to be such as to allow these pairs to operate normally as trigger pairs, and, when in the other condition, causing the bias on these pairs to be changed to cause them to operate to one of their conditions; and means coupling the first and fourth trigger pairs to enable the first pair to operate the fourth pair to said one condition to restore normal trigger pair operating characteristics to said second and third pairs.

3. In a multi-denominational order apparatus for accumulating values in the decimal notation, the combination of, for each denominational order, four trigger pairs, each operable to be triggered alternately to one and to another condition; means to supply operating potentials and bias potentials to the trigger pairs and including means to produce potential changes each time the pair changes from either condition to the other; circuits connecting the trigger pairs in series to enable a potential change produced by a pair to be applied as an impulse to the next pair of the series to cause its operation, the series connections enabling the pairs to be operated selectively in combination in response to input impulses applied to the first pair of the series; a direct-current feed-back circuit to couple a portion of the bias supply for the second and third trigger pairs of the series to the fourth trigger pair of the series to enable the fourth pair to control the bias on the second and third pairs, said fourth pair, when in one condition, causing the bias on the second and third pairs to be such as to allow these pairs to operate normally as trigger pairs, and, when in the other condition, causing the bias on these pairs to be changed to cause them simultaneously to make an additional operation to one of their conditions; and an additional circuit coupling the first and fourth trigger pairs to enable the first pair to operate the fourth pair to said one condition to restore normal trigger-pair-operating characteristics to said second and third pairs, said trigger pairs of each denominational order, when controlled by the series circuits, the direct-current feed-back circuit, and the additional circuit, operating to accumulate values and to progressively represent the digits "0" and "1" to "9" by combinations of said one and said other conditions.

4. In a device for accumulating values in the decimal notation, the combination of four pairs of electron discharge devices, each device having at least an anode, a cathode, and means to control conduction therebetween; circuits for supplying operating potentials to the devices and for cross-connecting the devices of a pair, anode to control means, to enable the devices of each pair to operate as a trigger pair and including means to produce an impulse for each change in operating condition of the pair, each pair being in "on" condition when conduction occurs in one device and in "off" condition when conduction occurs in the other device; means connecting the trigger pairs in cascade, including a circuit connecting the anode of the other device of a first one of said trigger pairs to the conduction control means of the devices of a second one of said trigger pairs and to the conduction control means of the one device of a fourth one of said trigger pairs, to enable the impulse, which is produced when the first trigger pair operates from "on" to "off" condition, to be applied to the second trigger pair to cause a trigger operation thereof and to be applied to the fourth trigger pair to turn it from "on" to "off" condition if it has been turned to its "on" condition, a circuit connecting the anode of the other device of the second trigger pair to the conduction control means of a third one of said trigger pairs to enable the impulse which is produced each time the second pair operates from "on" to "off" condition, to be applied to the third trigger pair to cause a trigger operation thereof and a circuit connecting the anode of the other device of the third trigger pair to the conduction control means of the other device of the fourth trigger pair to enable the impulse, which is produced when the third trigger pair operates from "on" to "off" condition, to be applied to the fourth pair to cause it to operate from "off" to "on" condition; a direct-current control circuit from the anode of the other device of the fourth trigger pair to the conduction control means of the one device of the second and third trigger pairs to enable the potential of the anode in the different operating conditions of the fourth pair to modify the bias on the control means of the second and third trigger pairs and cause these trigger pairs to be turned to "on" condition when the fourth trigger pair is in its "on" condition; and means to apply input impulses to the conduction control means of the first trigger pair; said trigger connections, cascade connections, and direct-current control circuit enabling the four trigger pairs to operate and accumulate amounts and progressively represent the digits "0" and "1" to "9" by combinations of "on" and "off" conditions of the trigger pairs.

5. In a device for accumulating values in the decimal notation, the combination of four pairs of electron discharge devices, each device having at least an anode, a cathode, and means to control conduction therebetween; circuits for supplying the operating and bias potentials to the devices and for cross-connecting the devices of a pair, anode to control means, to enable the devices of each pair to operate as a trigger pair in response to negative impulses, and including means to produce an impulse for each change in operating condition of the pair, each pair being in "on" condition when conduction occurs in one device and in "off" condition when conduction occurs in the other device; means connecting the trigger pairs in cascade, including a circuit connecting the anode of the other device of a first one of said trigger pairs to the conduction control means of the devices of a second one of said trigger pairs and to the conduction control means of the one device of a fourth one of said trigger pairs, to enable the negative impulse, which is produced when the first trigger pair operates from "on" to "off" condition, to be applied to the second trigger pair to cause a trigger operation thereof and to be applied to the fourth trigger pair to turn it from "on" to "off" condition if it has been turned to its "on" condition, a circuit connecting the anode of the other device of the second trigger pair to the conduction control means of a third one of said trigger pairs to enable the negative impulse which is produced each time the second pair operates from "on" to "off" condition, to be applied to the third trigger pair to cause a trigger operation thereof and a circuit connecting the anode of the other device of the third trigger pair to the conduction control means of the other device of the fourth trigger pair to enable the negative impulse, which is produced when the third trigger pair operates from "on" to "off" condition, to be applied to the fourth pair to cause it to operate from "off" to "on" condition; a direct-current control circuit from the anode of the other device of the fourth trigger pair to bias potential supply for the conduction control means of the one device of the second and third trigger pairs to enable the potential of the anode in the different operating conditions of the fourth pair to control the bias on the control means of the second and third trigger pairs to provide these trigger pairs with a bias that will allow normal trigger operations when the fourth pair is in "off" condition, and to provide these trigger pairs with a more positive bias that will cause the pairs simultaneously to be turned to "on" condition when the fourth trigger pair is in its "on" condition; and means to apply negative input impulses to the conduction control means of the first trigger pair; said trigger connections, cascade connections, and direct-current control circuit enabling the four trigger pairs to operate and accumulate amounts and progressively represent the digits "0" and "1" to "9" by combinations of "on" and "off" conditions of the trigger pairs.

CARL F. RENCH.

References Cited in the file of this patent

UNITED STATES PATENTS

| Number | Name | Date |
|---|---|---|
| 2,490,500 | Young | Dec. 6, 1949 |
| 2,521,788 | Grosdoff | Sept. 12, 1950 |
| 2,521,789 | Grosdoff | Sept. 12, 1950 |
| 2,536,955 | Palmer | Jan. 2, 1951 |
| 2,538,122 | Potter | Jan. 16, 1951 |
| 2,540,024 | Bergfors | Jan. 30, 1951 |
| 2,562,591 | Wagner | July 31, 1951 |
| 2,577,075 | Dickinson | Dec. 4, 1951 |
| 2,584,811 | Phelps | Feb. 5, 1952 |

OTHER REFERENCES

Electronics: "A Four Tube Counter Decade," by Potter, pages 110–113, June 1944.

RCA Review, vol. II, No. 3; "Electronic Counters," by Grosdoff, pages 438–447, September 1946.